United States Patent

Johnson

[15] 3,687,257
[45] Aug. 29, 1972

[54] THRESHOLD COMB FOR PASSENGER CONVEYOR

[72] Inventor: Ernest D. Johnson, 486 Narragansett Drive, Tallmadge, Ohio 44278

[22] Filed: Oct. 26, 1970

[21] Appl. No.: 83,964

Related U.S. Application Data

[63] Continuation-in-part of Ser. No. 20,930, March 19, 1970, abandoned.

[52] U.S. Cl. .................................................. 198/16
[51] Int. Cl. ............................................. B66b 9/12
[58] Field of Search ................ 198/16, 17, 18; 104/25

[56] References Cited

UNITED STATES PATENTS

| 3,137,382 | 6/1964 | Conover | 198/16 |
| 3,315,777 | 4/1967 | Margles | 198/16 |
| 3,153,470 | 10/1964 | Wieder | 198/16 |

FOREIGN PATENTS OR APPLICATIONS

| 195,517 | 4/1965 | Sweden | 198/16 |

*Primary Examiner*—Evon C. Blunk
*Assistant Examiner*—Hadd S. Lane
*Attorney*—F. W. Brunner, Frederick K. Lacher and Oberlin, Maky, Donnelly and Renner

[57] ABSTRACT

Threshold comb consists of a plurality of comb teeth adapted to extend into the conveyor grooves and movable laterally to provide for self-alignment of the comb teeth in the respective belt grooves. The comb teeth are supported on a slider bar which maintains the comb teeth out of contact with the conveyor to reduce friction and wear, and a constraining rod extends through the forward ends of the comb teeth to transfer the load applied to one tooth to adjacent teeth and to restrict the angularity of the teeth for preventing racking of the teeth on the slider bar. The configuration of the comb teeth also greatly facilitates transfer of objects from the conveyor to an adjacent landing surface.

12 Claims, 7 Drawing Figures

INVENTOR.
ERNEST D. JOHNSON

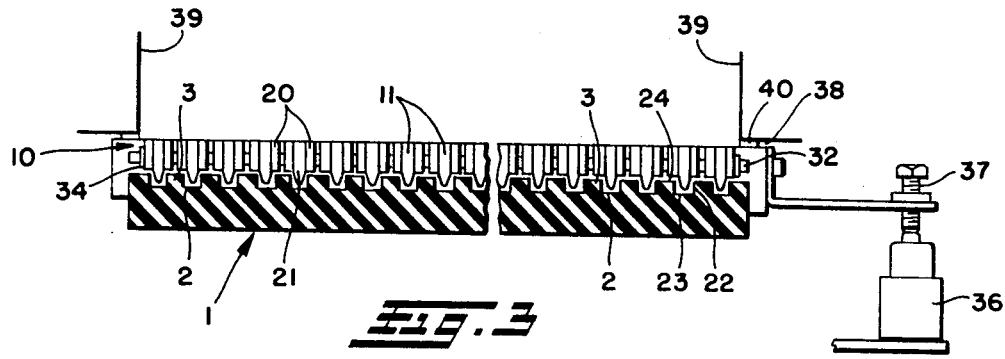
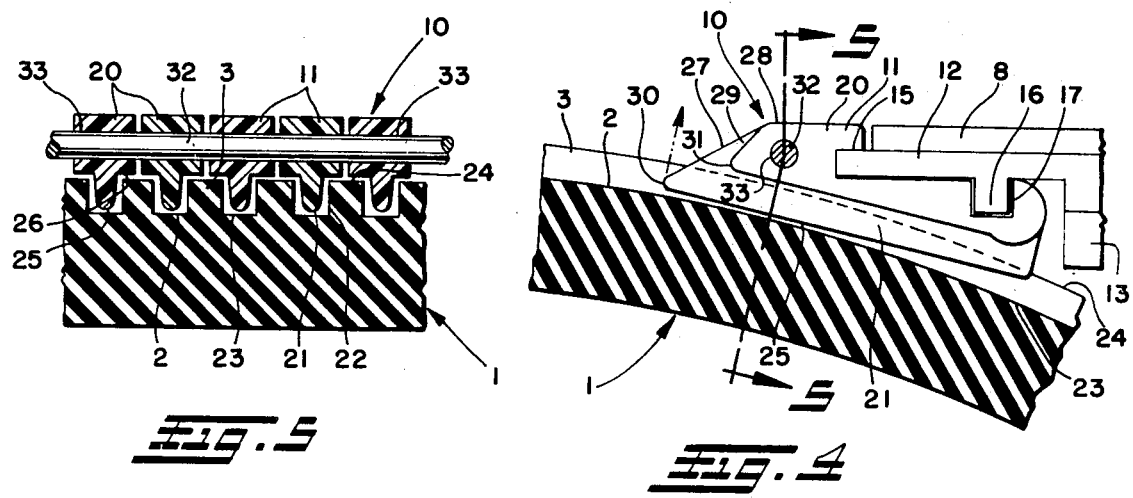
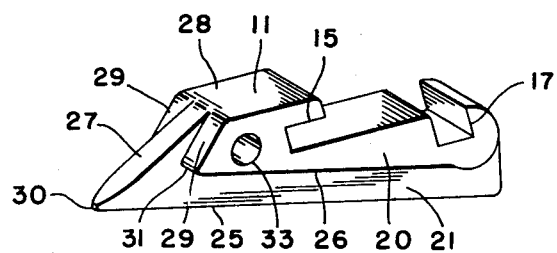
INVENTOR.
ERNEST D. JOHNSON
BY
Oberlin, Maky, Donnelly & Renner
ATTORNEYS INVENTOR.
ERNEST D. JOHNSON
BY
Oberlin, Maky, Donnelly & Renner
ATTORNEYS

THRESHOLD COMB FOR PASSENGER CONVEYOR

This application is a continuation-in-part of now abandoned U.S. application Ser. No. 20,930, filed Mar. 19, 1970, and relates generally as indicated to a threshold comb for passenger conveyors which is less complicated and more economical to manufacture and install than previous known threshold combs and provides for increased safety in preventing such difficult to handle objects as women's high heels, animal feet, clothing and other objects from becoming caught within the conveyor grooves and between the conveyor and threshold comb during discharge from the conveyor thus to avoid damage both to the objects and the conveyor.

Most present day conveyor systems, whether of the endless belt type or moving stairway type, are provided with a comb-like device adjacent the ends of the conveyor which have plural projections extending into grooves in the upper riding surface of the conveyor to bridge the gap between the conveyor and adjacent landing surfaces and assist in discharging objects riding on the upper conveyor surface and within the grooves onto such adjacent landing surfaces. In moving stairway conveyor systems, the comb-like projections may be fixed adjacent the ends of the conveyor and still remain in proper alignment with the grooves in the stairway plates since there is very little lateral movement of such stairway plates during operation. However, in endless belt conveyor systems the lateral movement of the belt is usually much greater which necessitates making the comb-like device laterally movable with the belt to maintain proper alignment of the projections within the belt grooves.

Ordinarily, it has been the usual practice to provide for such lateral movement of the comb structure by mounting the comb structure on a floating carriage which has followers engageable with the edges of the belt to cause movement of the carriage and comb structure from side to side with the belt. One drawback of such an arrangement is that it requires precise manufacture of the conveyor belt, carriage and comb structure to obtain the necessary relationship between parts for proper alignment of the comb-like projections within the belt grooves which greatly adds to the cost of the system. The setup time and effort required to adjust the combs of this arrangement so that their many teeth are in proper alignment with the grooves in the belt is also costly. Even then the edges of the belt may wear unevenly during operation resulting in misalignment between the projections and belt grooves with consequent increased wear and damage to the belt and comb structure.

Floating comb structures have also been used in conjunction with conveyor belts without the provision of a carriage or followers engaging the edges of the belt for guiding the movement thereof, but the amount of load that can be carried by such comb structures is quite limited, necessitating a rigid cover member for the comb structure, and the relative spacing between the grooves on the belt and comb teeth or projections must still be accurately maintained to assure proper alignment therebetween. Furthermore, such comb members generally ride on the upper surface of the belt ribs, which increases the friction and wear between parts, and such comb structures are not as effective as they might be in lifting certain objects from the conveyor and within the conveyor grooves for transfer onto an adjacent landing surface.

With the foregoing in mind, it is a principal object of this invention to provide a threshold comb structure for conveyor systems which is more safe and effective in transferring objects from the conveyor portion to an adjacent landing platform than existing threshold comb devices.

Another object is to provide such a comb structure which is more simple in construction, more economical to manufacture and easier to install than previous known threshold comb devices.

These and other objects of the present invention may be achieved by providing a threshold comb structure which has a plurality of individual comb teeth or groups of comb teeth mounted for independent lateral movement on a slider bar to permit self-alignment of the comb teeth within the conveyor grooves. The slider bar supports the comb teeth out of contact with the bottoms of the conveyor grooves and top surfaces of the conveyor ribs between such grooves to reduce friction and wear, and the comb teeth are sufficiently strong to support considerable loads without failing. A connecting rod extending through the forward ends of the teeth restructs the angularity of the teeth so as to prevent racking of the teeth on the slider bar and also provides for the transfer of a load applied to any one tooth to adjacent teeth. The individual comb teeth have separate lifting surfaces for objects within the grooves and on top of the ribs which greatly facilitates transfer of objects from the conveyor surface to an adjacent landing surface.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In the annexed drawing:

FIG. 3 is a fragmentary transverse section through the moving conveyor portion of FIG. 1 adjacent the threshold comb, taken on the plane of the line 3—3 thereof;

FIG. 4 is an enlarged fragmentary side elevation view of the comb teeth and supporting structure therefor, showing the disposition of one of the comb teeth in a groove in the moving conveyor portion;

FIG. 5 is a fragmentary transverse section through the comb teeth and moving conveyor portion of FIG. 4, taken on the plane of the line 5—5 thereof;

FIG. 6 is an enlarged isometric view of one of the comb teeth; and

Figure 1:
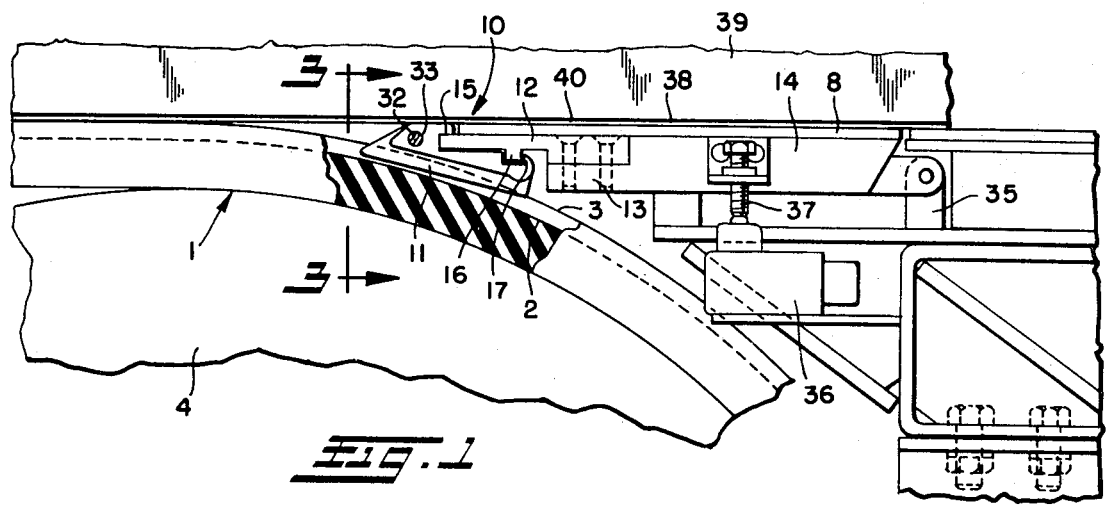
FIG. 1 is a fragmentary schematic side elevation view of a preferred form of threshold comb constructed in accordance with this invention at one end of a conveyor, with parts of the moving conveyor portion being broken away to show the relative position of one of the individual teeth of the comb within a groove in the moving conveyor portion.
Figure 2:
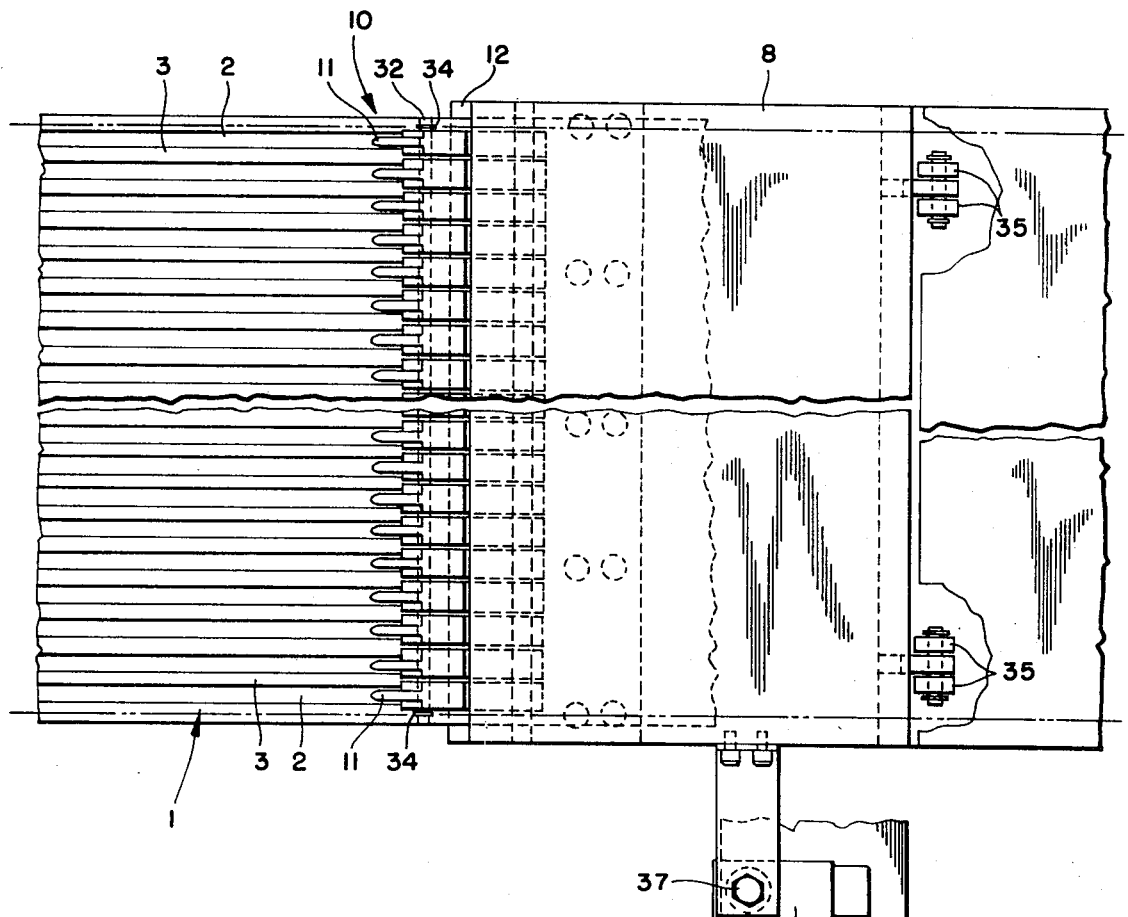
FIG. 2 is a fragmentary top plan view of the threshold comb and conveyor of FIG. 1.

Referring now in detail to the drawing, and first especially to FIGS. 1 and 2 thereof, there is shown a conveyor system including a moving conveyor portion 1 which may be a conveyor belt of conventional type having a plurality of closely spaced longitudinal grooves 2 in the upper load supporting surface thereof separated by longitudinal ribs 3 integral with the belt. The belt 1 is of an endless nature and extends around terminal pulleys 4 at opposite ends of the conveyor system for travel between the upper and lower runs of the belt. However, it should be understood that the moving conveyor portion 1 may be of any other suitable structure, including moving stairway plates, if desired.

Adjacent each end of the moving conveyor portion is a stationary landing surface 8 onto which passengers and other objects are discharged from the moving conveyor portion or from which passengers and objects move onto the conveyor portion depending on the direction of movement of the conveyor portion. To assist in making a smooth transition from the moving conveyor portion to the non-moving surface 8 and vice versa, a threshold comb 10 in accordance with this invention is disposed between the moving conveyor portion 1 and non-moving surface 8 and carried by the forward end of the non-moving surface. As shown, such threshold comb 10 consists of a plurality of individual comb teeth 11, one such tooth extending into each longitudinal groove 2 in the moving conveyor portion and supported for limited lateral movement on a slider bar 12 to permit self-centering of the individual comb teeth within the respective grooves during limited lateral movement of the conveyor portion 1 from side to side when in operation. As best seen in FIG. 1, the slider bar 12 is securely fastened to a flange 13 on the undercarriage support 14 for the landing surface 8 and extends a short distance beyond the forward end of the landing surface for receipt in a generally rearwardly opening slot or groove 15 in each of the individual comb teeth 11. Rearwardly of the leading end of the slider bar 12 is a downwardly depending rib 16 extending transversely across the width of the slider bar for receipt in a second generally upwardly opening slot or groove 17 in the individual comb teeth. Such a sliding connection between the slider bar 12 and comb teeth 11 allows freedom of movement of the comb teeth 11 laterally of the slider bar while providing adequate support for the comb teeth when a downward load is applied thereto, in a manner to be more fully described hereinafter.

As best seen in FIGS. 4 through 6, each individual comb tooth 11 consists of a main body portion 20 of a width somewhat less than the width of one of the ribs 3 plus the width of one of the longitudinal grooves 2 in the moving conveyor portion 1 and a relatively narrow longitudinally extending central rib portion 21 projecting downwardly from the main body portion 20 of a width somewhat less than the width of the one of grooves 2 for receipt in the grooves 2 without contacting the sides 22 thereof. The slider bar 12 also supports the individual comb teeth out of engagement with the bottoms 23 and tops 24 of the conveyor grooves to eliminate friction and wear between parts.

Preferably, the bottom edge 25 of the central rib portion 21 is straight and parallel to the straight bottom edges 26 of the main body portion 20 on opposite sides of the central rib portion 21 and the rib portion 21 extends forwardly of the main body portion 20 to provide an inclined leading edge or face 27 which extends upward at a relatively low angle, desirably approximately 28° or preferably in the range of from about 10° to about 30° to the top surface 28 of the main body portion 20 for lifting objects out of the grooves and onto the landing surface 8. The leading edges or faces 29 of the main body portion 20 are also inclined upwardly desirably at an angle of approximately 45° or preferably at an angle that is from about 10° to about 30° greater than the angle of inclination of the leading face 27 of the rib portion 21 to provide separate lifting surfaces for objects on top of the ribs 3, in a manner to be subsequently fully described.

To minimize the chance of objects from becoming caught between the comb teeth 11 and adjacent surfaces of the moving conveyor portion 1, the clearance space therebetween should be kept to a minimum, and the forwardmost corners 30 and 31 of the inclined leading surfaces 27 and 29 and bottom edge 25 of the comb teeth 11 are also desirably rounded to assist in directing objects upwardly onto such inclined leading surfaces. However, the vertical clearances should be sufficient to allow for some deflection of the comb teeth when a load is applied thereto without being forced into frictional engagement with the tops 24 of the conveyor ribs 3 and bottoms 23 of the conveyor grooves 2. Preferably, the minimum vertical clearance between such teeth 11 and associated moving conveyor portions is approximately one-thirty-second inch, and the maximum deflection of the teeth and associated support structure is no more than one-sixty-fourth inch when a 600 lb. point load is applied thereto.

In operation, the central rib portions 21 of the comb teeth 11 follow the conveyor grooves 2, and should the moving conveyor portion 1 wander slightly from side to side, the sides of the conveyor ribs 24 will engage the sides of the central rib portions 21 of the comb teeth 11 and cause a corresponding lateral movement of the conveyor teeth along the slider bar 12 for maintaining proper alignment of the comb teeth 11 within the conveyor grooves 2. Any tendency of the comb teeth 11 to rack or bind on the slider bar 12 during such lateral movement may be eliminated by providing a constraining rod 32 extending through aligned openings 33 in the forward ends of the comb teeth. Racking or binding of the comb teeth 11 on the slider bar 12 can only occur if the amount of permissible angular movement of the comb teeth is greater than the rack angle. Accordingly, by controlling the fit of the comb teeth 11 on the constraining rod 32 and on the slider bar 12 so that the teeth will rack on the constraining rod before they rack on the slider bar, racking of the teeth on the slider bar is prevented, thus assuring freedom of movement of the comb teeth laterally along the slider bar. Should the comb teeth 11 rack or bind on the constraining rod, this is of no consequence since the constraining rod is free to move with the teeth, it being retained in place solely by snap rings 34 on the ends of the rod. The constraining rod 32 also has the additional advantage that it readily transfers the load applied on any given comb tooth to the adjacent teeth to reduce the chance of failure even when a high point load is applied against a single comb tooth.

To reduce to a minimum the amount of friction between the sides of the conveyor ribs 3 and comb teeth 11 and also between such comb teeth, constraining rod 32 and slider bar 12 during lateral movement of the conveyor portion and comb teeth even when a high load is applied to the comb teeth, the comb teeth are desirably made of relatively lightweight, high strength material such as glass filled nylon which will support up to 600 lb. point load without failing and without deflecting more than one-sixty-fourth inch under such 600 lb. load. Glass filled nylon is also a desirable material for the comb teeth because of its relatively low cost and high abrasion resistance for prolonged life of the comb teeth without causing wear to the moving conveyor portion. Molydisulfide particles may also be interspersed within the nylon to reduce friction and eliminate noise generated by tooth-belt contact. The constraining rod 32 and slider bar 12 are desirably made of stainless steel which has a low co-efficient of friction with the tooth material, whereas the landing plate 8 is desirably made of high abrasion resistant material such as hardened aluminum, stainless steel or rubber, for example, in the form of a molded mat. The plate 8 is preferably provided with a nonslip surface for passengers and objects.

During movement of the conveyor portion 1 toward the right as viewed in FIGS. 1, 2 and 4, any objects carried on the tops of the conveyor ribs 3 or within the conveyor grooves 2 will be effectively transferred from the moving conveyor portion 1 to the landing surface 8 by the lifting action of the comb teeth 11 which causes the objects to be slid safely across the teeth from the moving surface to the stationary landing plate. Objects within the conveyor grooves 2 are lifted out of the grooves by the low angle leading surfaces 27 of the comb teeth, and such objects may continue to ride up such leading surfaces 27 to the landing surface 8 or such objects may be lifted to the top of the conveyor ribs 3 and ride up the leading surfaces 29 of such teeth. Objects initially on the tops of the conveyor ribs 3 will still ride up the low angle surfaces 27 of the comb teeth unless such objects are of a relatively small width to be picked up by the higher angle surfaces 29 and lifted to the landing surface 8 thereby.

To further facilitate transfer of objects from the moving conveyor portion 1 to the landing surface 8, the bottom edges 25 of the comb teeth 11 are desirably disposed at a slight angle within the initial downwardly curved portion of the conveyor 1 around the terminal pulley 4 and located sufficiently below the upper surface of the conveyor portion that the upper edges 28 of the comb teeth are in the same general plane as the upper surface of the conveyor portion, so that no lifting force is required to lift large objects on the upper surface of the conveyor portion up onto the upper edges of the comb teeth and landing surface 8. Thus, the comb teeth offer very little resistance to objects making the transition from the moving conveyor portion to the non-moving landing surface 8. Yet once the transition is made, the landing surface provides a nonslip surface which causes heel lift and helps maintain balance.

Although the likelihood of an object becoming lodged in the conveyor grooves 2 and caught between the comb teeth 11 and moving conveyor portion 1 is slight, nevertheless in the event that such should occur, the undercarriage support 14 for the landing plate 8 and slider bar 12 is pivotally connected to a fixed support 35 to permit slight vertical outward movement of the comb teeth by the caught object which actuates a limit switch 36 on the fixed support 35 for interrupting the movement of the conveyor portion to prevent damage to the object and conveyor system. The extent of outward travel of the comb teeth 11 to actuate the limit switch 36 may be controlled by adjustment of a screw 37 on the undercarriage 14 which engages the limit switch. Preferably, a one-thirty-second inch vertical movement of the comb teeth 11 is sufficient to trip the limit switch 36 to stop the conveyor movement for safety purposes, and the total permissible vertical movement of the comb teeth is desirably limited to approximately one-sixteenth inch by the clearance space 38 between the edges of the landing plate 8 and the trim plates 39 at the sides of the conveyor to guard against large objects from being pulled into the space between the conveyor and comb teeth. Such clearance space between the trim plates and landing plate is also desirably filled with a sponge rubber or other resilient material 40 which will permit limited vertical movement of the landing plate until compressed to provide a stop against further movement.

Figure 7:
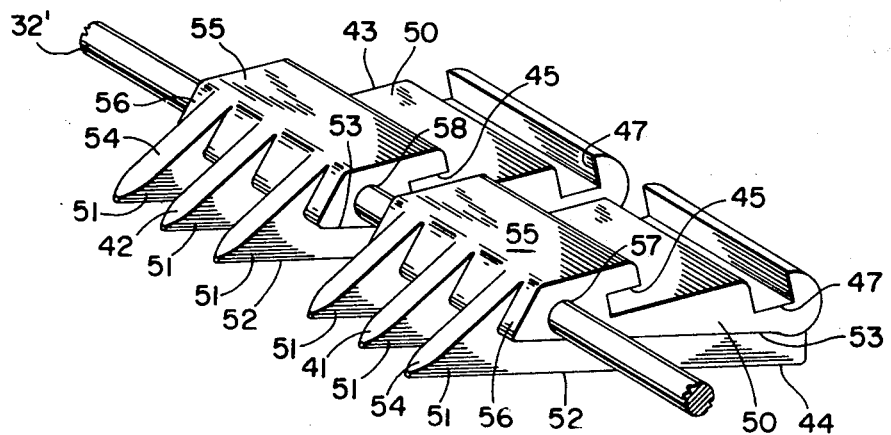
FIG. 7 is an isometric view like FIG. 6 but of a modification of the invention showing groups of comb teeth in comb segments mounted on a constraining rod.

Referring to FIG. 7, a modification is shown in which groups of comb teeth 41 and 42 are fastened together in comb segments 43 and 44. A generally rearwardly opening slot or groove 45 in each of the comb segments 43 and 44 is provided for receiving the slider bar 12 previously described. A second generally upwardly opening slot or groove 47 in the comb segments 43 and 44 is provided to receive the downwardly depending rib 16 on the slider bar 12 to provide a sliding connection between the slider bar 12 and comb segments 43 and 44 as well as other comb segments (not shown), allowing freedom of movement of the comb segments laterally of the slider bar while providing adequate support for the comb teeth 41 and 42 when a downward load is applied thereto.

Each of the comb segments 43 and 44 desirably consists of a main body portion 50 and relatively narrow longitudinally extending rib portions 51 projecting downwardly from the main body portion and having a width somewhat less than the width of the conveyor grooves 2 for receipt in the grooves without contacting the sides 22 thereof. The slider bar 12 also supports the comb segments 43 and 44 out of engagement with the bottoms 23 and tops 24 of the conveyor grooves to eliminate friction and wear between parts.

Preferably bottom edges 52 of the rib portions 51 are straight and parallel to straight bottom edges 53 of the main body portion 50 on opposite sides of the rib portions 51. The rib portions 51 extend forwardly of the main body portion to provide an inclined leading edge or face 54 which extends upward at a relatively low angle, desirably approximately 28° and preferably in the range of from about 10° to about 30° to a top surface 55 of the main body portion 50 for lifting objects out of the conveyor grooves 2 and onto the landing surface 8. The leading edges or faces 56 of the main body portion 50 are also inclined upwardly, desirably at an angle of approximately 45° or preferably at an angle from about 10° to about 30° greater than the angle of inclination of the leading face 54 of the rib portion 51 to provide separate lifting surfaces for objects on top of the ribs 51.

Any tendency of the comb segments 43 and 44 to rack or bind on the slider bar 12 during lateral movement may be eliminated by providing a constraining rod 32' similar to the constraining rod 32 for the individual comb teeth 11 extending through aligned openings 57 and 58 in the forward ends of the groups of comb teeth 41 and 42. Racking or binding of the comb segments 43 and 44 on the slider bar 12 can only occur if the amount of permissible angular movement of the comb segments is greater than the rack angle. Accordingly, by controlling the fit of the comb segments 43 and 44 on the constraining rod 32' and on the slider bar 12 so that the comb segments will rack on the constraining rod before they rack on the slider bar, racking of the comb segments on the slider bar is prevented, thus assuring freedom of movement of the comb segments laterally along the slider bar. Should the comb segments 43 and 44 rack or bind on the constraining rod 32', the constraining rod is still free to move with the comb segments since it is retained in place solely by the snap rings 34 on the ends of the rod.

Preferably the comb segments 43 and 44 are desirably made of a relatively lightweight, high strength material such as glass filled nylon because of its relatively low cost and high abrasion resistance for prolonged life of the comb segments without causing wear to the moving conveyor portion. Molydisulfide particles may also be interspersed within the nylon to reduce friction and eliminate noise generated by tooth-belt contact.

From the foregoing, it will now be apparent that the threshold comb of the present invention is of a relatively low cost and simple construction which nevertheless minimizes the chances of an object from becoming caught between the conveyor and threshold comb. If an object should become caught, the threshold comb will immediately move upwardly and shut the conveyor down for maximum safety. Moreover, because the threshold comb consists of a plurality of individual comb teeth or comb segments mounted for lateral movement, such teeth will remain self-aligned with the conveyor grooves without the need for the elaborate, bulky, and costly precision made carriages now in use to maintain engagement between the comb teeth and conveyor grooves. The conveyor teeth are also designed to withstand high loads without failing or causing excessive wear to the comb teeth, and should it become necessary to replace one of the comb teeth or comb segments after a period of time, it is a simple matter to do so by raising the comb teeth out of the grooves, removing the constraining rod, and sliding the comb teeth or comb segments off of one end of the slider bar.

While certain representative embodiments and details have been shown for the purpose of illustrating the invention, it will be apparent to those skilled in the art that various changes and modifications may be made therein without departing from the spirit or scope of the invention.

I, therefore, particularly point out and claim as my invention:

1. A conveyor system having an endless conveyor load supporting surface with longitudinal grooves and ribs therein for transporting passengers and objects between landing surfaces adjacent opposite ends thereof, wherein the improvement comprises a threshold comb between said load supporting surface and an adjacent landing surface comprising a plurality of comb teeth adapted to extend longitudinally into the longitudinal grooves in the load supporting surface for bridging the gap between the load supporting surface and adjacent landing surface to assist passengers and objects in making a smooth transition between such surfaces, mounting means for mounting said comb teeth on said landing surface for lateral sliding movement relative to each other and to said landing surface to permit self-alignment of said comb teeth in the respective grooves in said load supporting surface and constraining means in sliding engagement with said comb teeth to permit lateral movement of said comb teeth relative to said constraining means while restricting the angularity of said comb teeth.

2. The conveyor system of claim 1 wherein said constraining means comprises a constraining rod means extending through aligned openings in said comb teeth for sliding movement of said comb teeth on said rod means.

3. The conveyor system of claim 2, wherein said mounting means for said comb teeth comprises a slider bar secured to such adjacent landing surface, said comb teeth having a sliding connection with said slider bar which allows freedom of movement of said comb teeth laterally of said slider bar while supporting said comb teeth when a downward load is applied thereto.

4. A conveyor system of claim 1, wherein said comb teeth are fastened together in groups forming plural comb segments for lateral movement relative to said constraining means to permit self-alignment of said comb teeth in the respective grooves in said load supporting surface.

5. A conveyor system of claim 4, wherein said constraining means comprises a constraining rod means extending through aligned openings in said plural comb segments for sliding movement of said comb segments on said rod means.

6. A conveyor system having an endless conveyor load supporting surface with longitudinal grooves and ribs therein for transporting passengers and objects between landing surfaces adjacent opposite ends thereof, wherein the improvement comprises a threshold comb between said load supporting surface and an adjacent landing surface comprising a plurality of comb teeth adapted to extend longitudinally into the longitudinal grooves in the load supporting surface for bridging the gap between the load supporting surface and adjacent landing surface to assist passengers and objects in making a smooth transition between such surfaces, mounting means for said comb teeth including a slider bar secured to such adjacent landing surface, said comb teeth having a sliding connection with said slider bar which allows freedom of movement of said comb teeth laterally of said slider bar while supporting said comb teeth when a downward load is applied thereto, constraining means including constraining rod means extending through aligned openings in said comb teeth and each of said comb teeth including a main body portion of a width somewhat less than the width of a rib plus the width of a groove, and a relatively narrow longitudinally extending central rib portion projecting downwardly from said main body portion of a width somewhat less than the width of said grooves for receipt therein, said comb teeth being supported out of engagement with the bottoms of said grooves and tops of the ribs between said grooves by said slider bar to eliminate friction and wear between parts.

7. The conveyor system of claim 6, wherein said central rib portion extends forwardly of said main body portion and has an inclined leading edge which extends upwardly at an angle to the top surface of said main body portion for lifting objects out of the grooves in said load supporting surface, and said main body portion has inclined leading edges on opposite sides of the leading edge of said central rib portion which are inclined at a greater angle to provide separate lifting surfaces for objects on top of the ribs of said load supporting surface.

8. The conveyor system of claim 7, wherein the angle of inclination of the leading edge of said central rib portion is from about 10° to about 30° and the angle of inclination of the leading edges of said main body portion is from about 10° to about 30° greater than the angle of inclination of the leading edge of said central rib portion.

9. The conveyor system of claim 7, wherein the forwardmost corners of said inclined leading edges and bottom edge of said central rib portion are rounded to assist in directing objects upwardly onto such inclined leading edges.

10. The conveyor system of claim 7, wherein the vertical clearance between said comb teeth and conveyor load supporting surface is approximately one thirty-second inch and the maximum downward deflection of said comb teeth and support is approximately one sixty-fourth inch under load.

11. A conveyor system having an endless conveyor load supporting surface with longitudinal grooves and ribs therein for transporting passengers and objects between landing surfaces adjacent opposite ends thereof, wherein the improvement comprises a threshold comb between said load supporting surface and an adjacent landing surface comprising a plurality of comb teeth adapted to extend longitudinally into the longitudinal grooves in the load supporting surface for bridging the gap between the load supporting surface and adjacent landing surface to assist passengers and objects in making a smooth transition between such surfaces, mounting means for mounting said comb teeth for lateral movement to permit self-alignment of said comb teeth in the respective grooves in said load supporting surface and constraining means in engagement with said comb teeth to restrict the angularity of said comb teeth, means for pivotally mounting said landing surface for limited vertical outward movement of said comb teeth in said grooves and trim plates having a vertical clearance space with the sides of said landing surface which limit the vertical outward movement of said comb teeth to prevent large objects from being pulled into the space between said comb teeth and load supporting surface.

12. The conveyor system of claim 11, wherein said clearance space between said trim plates and landing surface is filled with a resilient material which permits limited vertical movement of said landing surface until said resilient material is sufficiently compressed to provide a stop against further movement.

* * * * *

PO-1050
(5/69)

UNITED STATES PATENT OFFICE
CERTIFICATE OF CORRECTION

Patent No. 3,687,257          Dated  August 29, 1972

Inventor(s) Ernest D Johnson

It is certified that error appears in the above-identified patent and that said Letters Patent are hereby corrected as shown below:

In the legend, after "(72) Inventor", please add the following:

--(73) Assignee: Goodyear Tire & Rubber Company, Akron, Ohio--

Signed and sealed this 20th day of March 1973.

(SEAL)
Attest:

EDWARD M. FLETCHER, JR.          ROBERT GOTTSCHALK
Attesting Officer                Commissioner of Patents